US008533719B2

(12) United States Patent
Fedorova et al.

(10) Patent No.: US 8,533,719 B2
(45) Date of Patent: Sep. 10, 2013

(54) CACHE-AWARE THREAD SCHEDULING IN MULTI-THREADED SYSTEMS

(75) Inventors: Alexandra Fedorova, Vancouver (CA); David Vengerov, San Jose, CA (US); Kishore Kumar Pusukuri, Riverside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 385 days.

(21) Appl. No.: 12/754,143

(22) Filed: Apr. 5, 2010

(65) Prior Publication Data

US 2011/0246995 A1 Oct. 6, 2011

(51) Int. Cl.
*G06F 9/46* (2006.01)
*G06F 15/00* (2006.01)
*G06F 13/00* (2006.01)

(52) U.S. Cl.
USPC ........... 718/102; 718/103; 718/107; 711/125; 712/30; 712/214

(58) Field of Classification Search
None
See application file for complete search history.

(56) References Cited

U.S. PATENT DOCUMENTS

2008/0195849 A1* 8/2008 Gonzalez et al. ............. 712/223
2010/0095300 A1* 4/2010 West et al. .................... 718/104

OTHER PUBLICATIONS

Snavely, Allan et al., "Symbiotic Jobscheduling for a Simultaneous Multithreading Processor", Published in the Proceedings of ASPLOX IX, Nov. 2000.

* cited by examiner

*Primary Examiner* — Kenneth Tang
(74) *Attorney, Agent, or Firm* — Park, Vaughan, Fleming & Dowler, LLP; Mark D. Spiller

(57) ABSTRACT

The disclosed embodiments provide a system that facilitates scheduling threads in a multi-threaded processor with multiple processor cores. During operation, the system executes a first thread in a processor core that is associated with a shared cache. During this execution, the system measures one or more metrics to characterize the first thread. Then, the system uses the characterization of the first thread and a characterization for a second, second thread to predict a performance impact that would occur if the second thread were to simultaneously execute in a second processor core that is also associated with the cache. If the predicted performance impact indicates that executing the second thread on the second processor core will improve performance for the multi-threaded processor, the system executes the second thread on the second processor core.

19 Claims, 5 Drawing Sheets

CACHE-AWARE THREAD SCHEDULING IN MULTI-THREADED SYSTEMS

BACKGROUND

1. Field

This disclosure generally relates to techniques for predictively scheduling threads in a multi-threaded computer system. More specifically, this disclosure relates to techniques for determining and using thread characterizations and predicted performance impacts while making cache-aware thread-scheduling decisions.

2. Related Art

Although historic increases in processor clock frequencies have substantially improved application performance, recent increases in clock frequencies have led to diminishing performance gains. For instance, because memory speeds have not advanced at the same rate as processor frequencies, processor threads spend an increasing amount of time waiting for memory accesses to complete. Furthermore, increased clock speeds can dramatically increase power consumption, which can cause heat-dissipation problems.

Chip multi-threading (CMT) techniques provide an alternative way to improve processor performance. CMT processors include multiple processor cores which can simultaneously execute multiple software threads, thereby allowing multi-threaded applications to achieve increased performance by utilizing multiple processor threads, without any increase in processor clock frequency.

However, multi-threading may also introduce additional challenges. Multi-core processor architectures typically include one or more caches or memories that are shared among multiple threads and/or cores. For instance, depending on their cache access characteristics, two threads that share a cache may interfere with each others' cache data and cause pipeline resource contention that can reduce the performance of both threads. Also, a "cache-intensive" thread with a high cache miss rate may negatively affect a second "cache-sensitive" thread that re-uses cache data and dramatically suffers in performance when this cache data is displaced by other threads. Unfortunately, it is hard to predict ahead of time whether two threads that share a common cache will interoperate favorably or interfere with each other.

Hence, what is needed are techniques for scheduling threads without the above-described problems of existing pre-fetching techniques.

SUMMARY

The disclosed embodiments provide a system that facilitates predictively scheduling threads in a multi-threaded processor. During operation, the system executes a first thread in a processor core that is associated with a shared cache. During this execution, the system measures one or more metrics to characterize the first thread. Then, the system uses the characterization of the first thread and a characterization for a second thread to predict a performance impact that would occur if the second thread were to simultaneously execute in a second processor core that is also associated with the cache. If the predicted performance impact indicates that executing the second thread on the second processor core will improve performance for the multi-threaded processor, the system executes the second thread on the second processor core.

In some embodiments, the system measures one or more of the following metrics over a time interval: the number of cycles elapsed per second for a processor core; the average instructions executed per cycle (or per time interval) by a thread; the average cache accesses per instruction (or per time interval) for the thread; and the average cache misses per instruction (or per time interval) for the thread.

In some embodiments, the system uses the measured metrics to determine whether a thread is cache-intensive, cache-sensitive, and/or cache-insensitive.

In some embodiments, the system simultaneously gathers metrics for the first thread, the second thread, and a third thread. The first and third thread execute on processor cores that share the shared cache, while the second thread executes on another processor core which uses a different cache. The system then uses the gathered metrics to characterize all three threads, and considers the characterizations and metrics from the threads when predicting the performance impact of swapping the second and the third threads.

In some embodiments, the system estimates the performance impact of a migration by predicting a degradation in the average instructions executed per cycle for one or more of the first thread, the second thread, and the third thread.

In some embodiments, the system can gather data for thread characteristics and associated performance impacts by periodically migrating one or more threads between processor cores of the multi-threaded processor. Alternatively, the system may instead (or also) opportunistically gather data during normal multi-threaded execution in the multi-threaded processor.

In some embodiments, the system uses online thread characteristic and performance data to facilitate scheduling threads across processor cores.

In some embodiments, the system uses application-independent scheduling techniques that are self-managing across changing data sets, changing data access patterns, and changing user requests.

In some embodiments, the system includes a forecasting system that uses the gathered data to predict performance impacts for different thread-scheduling decisions. The system can use statistical feedback from measured metrics, thread characteristics, and thread interactions to update parameters of this forecasting system.

In some embodiments, the system facilitates improving the overall instruction throughput for the chip multi-threaded processor. Alternatively, the system may also facilitate (and/or prioritize) reducing the power consumed by the chip multi-threaded processor while executing a set of threads.

In some embodiments, a processor core in the multi-threaded processor can execute multiple threads simultaneously. In such a processor, the above-mentioned processor core and second processor core may be a single processor core that can simultaneously execute both the first thread and the second thread. In such an environment, the system predicts the performance impact associated with simultaneously executing the first thread and the second thread on this single processor core.

BRIEF DESCRIPTION OF THE FIGURES

In the figures, like reference numerals refer to the same figure elements.

DETAILED DESCRIPTION

Figure 1:
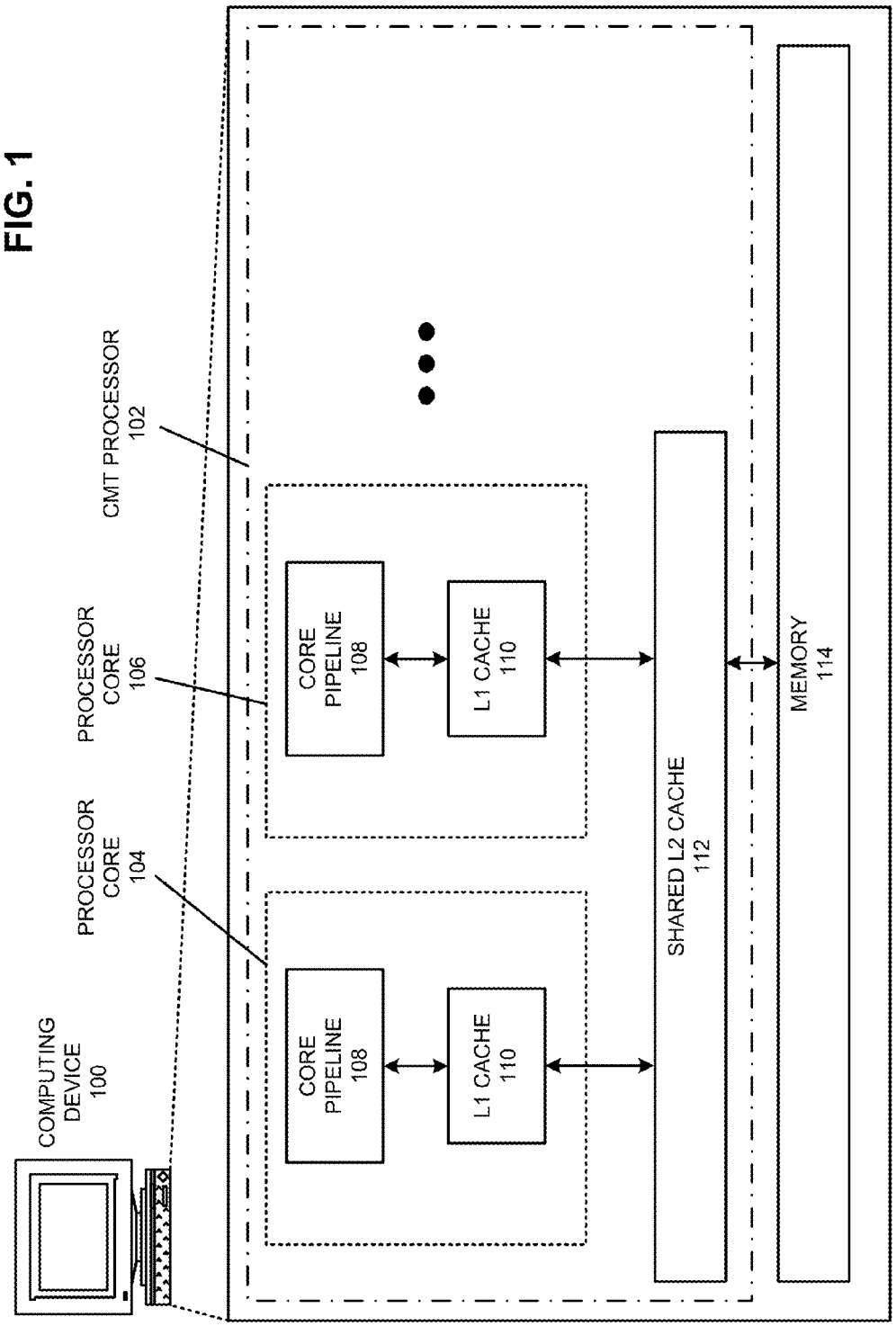
FIG. 1 illustrates an exemplary computing device that includes a set of shared structures for caching memory data in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Thread Interference in Multi-Threaded Systems

Increasingly complex software applications continue to motivate improvements in processor technology, both for personal computing devices as well as server-scale computers. For instance, the popularity of large-scale applications and cloud computing depend on the computational support of an ever-growing set of data centers (e.g., server farms). However, the expense of such data centers continues to grow due to equipment costs as well as power and cooling costs. One way to reduce costs and power usage is to consolidate workloads. For instance, chip multi-threading (CMT) processors with multiple processor cores allow multiple applications and/or application threads to execute simultaneously on a given server, thereby reducing the total number of server systems and resources needed in the data center. However, the potential benefits of simultaneously executing multiple applications on a CMT processor can be diminished by negative interactions between co-located threads.

In a processor, high instruction throughput typically involves rapid translation of virtual addresses and fast memory accesses. To achieve such throughput, the memory subsystem of a processor may include a number of specialized hardware structures that cache frequently accessed data, perform address translations, and generally speed up memory accesses. For instance, in modern multi-core processors, such specialized hardware structures may include multiple levels of caches, and at least one of these multiple levels of caches is often shared across multiple cores. The memory subsystem may also include a number of other hardware structures that may be shared by two or more processor cores (e.g., pre-fetch hardware, a memory controller, and a memory bus).

Processors can swap out a stalled thread (e.g., a thread that is waiting for data from the memory subsystem), thereby allowing other threads to execute while the stalled thread's memory request completes. However, memory access speeds have not kept up with processor speed improvements, and as mentioned above, in some instances chip multi-threading techniques can increase the contention and load for shared structures. Hence, shared memory resources can become a bottleneck that reduces overall thread performance.

FIG. 1 illustrates an exemplary computing device 100 that includes a set of shared structures for caching memory data. Computing device 100 can include a CMT processor 102 with two or more processor cores 104-106, each of which includes a processor core pipeline 108 and a level-one (L1) cache 110. Processor cores 104-106 share a level-two (L2) cache 112. Instructions executed in a core pipeline 108 that reference memory addresses trigger a request to an L1 cache 110. A miss in an L1 cache 110 results in a request to the shared L2 cache 112, which returns the needed cache data to the requesting L1 cache 110. A miss in shared L2 cache 112 results in a request to main memory 114.

In some processor architectures, multiple threads may execute in different processor cores, or even execute simultaneously in a single processor core. For instance, two threads executing in processor core 104 may share both an L1 cache 110 as well as the shared L2 cache 112. Alternatively, two threads executing in processor core 104 and processor core 106 respectively share L2 cache 112. Depending on thread and workload characteristics, such sharing of cache structures between multiple threads can lead to contention and decreased instruction throughput for CMT processor 102. Note that the memory hierarchy illustrated in FIG. 1 is exemplary, and different implementations may have additional cache levels as well as different granularities of sharing for cache structures.

Unfortunately, predicting how much contention will arise for a given shared resource is typically difficult, and the presence of a number of different shared resources makes predicting how two applications will affect each other's performance difficult. For instance, one issue when designing thread-scheduling policies for CMT systems is how to efficiently share a last-level cache (e.g., a shared level-two (L2) cache) across threads with potentially different access patterns. Scheduling efforts may need to account for threads that have different levels of cache access "intensity" and "sensitivity." Cache intensity relates to frequency of cache accesses; "cache-intensive" threads tend to perform more cache accesses (e.g., regularly access cache data) than non-cache-intensive threads. Cache sensitivity relates to the cache re-use behavior of a thread. The cache accesses of threads that are "cache-sensitive" tend to heavily re-use cached data, and thus the thread will suffer in performance if the thread's cached data has been displaced by other threads. Threads that are cache-intensive but "cache-insensitive" typically perform many cache accesses, but do not re-use data (e.g., such threads regularly access new data instead of re-using data already loaded in the cache, and thus have a high cache miss rate). Note that a thread's cache intensity and sensitivity may change in time (e.g., depending on a given workload or other application factors).

A thread-scheduling policy that schedules a cache-intensive, cache-insensitive thread to share a cache with a cache-intensive, cache-sensitive thread may degrade performance; the cache access patterns of the cache-insensitive thread may repeatedly displace the cached data of the cache-sensitive thread, thereby substantially increasing the miss rate of the cache-sensitive thread. However, in some alternative scenarios, (e.g., if the working set of the two threads is small, the cache size is large, and/or the number of cache ways is high), the cache-sensitive thread may touch its cached data sufficiently frequently to keep the data in the shared cache, thereby avoiding additional performance degradation. Unfortunately, it is not clear how to predict ahead of time whether threads will be able to co-exist well on a pair of cores that share a common cache or whether the threads will interfere with each other. Experimental tests have indicated that in some instances the instructions per cycle (IPC, a standard performance metric for a thread scheduler) for a thread may vary by more than 40% when a range of other threads are assigned to share a resource in a multi-core CMT system.

As described above, predicting the specific IPC for a thread that is not executing in isolation is difficult, because the IPC of threads depends on many factors that are unrelated to resource sharing and/or difficult to measure at the operating-system (OS) level. The actual IPC will depend on both the thread's properties and the properties of potential "co-runner thread(s)" (e.g., one or more additional threads that execute simultaneously and share some resource, such as a cache, with the first thread). However, the cache miss rate for a thread can be a good indicator (and predictor) of the "stress" that a given application imposes on bottleneck shared memory resources. For instance, a cache-intensive, cache-insensitive application thread typically has a high cache miss rate, which corresponds with the relatively high amount of stress placed on the memory hierarchy by frequent memory accesses to new memory data (e.g., the thread doesn't re-use cached data much, and thus is not as affected when its data is evicted from the cache, but the frequent cache misses from the memory accesses to un-cached data cause contention for lower-level memory structures). In contract, a cache-intensive, cache-sensitive thread that re-uses cache data heavily (when such data is not displaced from the cache) has a lower cache miss rate, which corresponds with high sensitivity to cache contention but less stress imposed on the lower-level memory structures (because more of the memory requests are serviced by the cache). If the data of the thread is evicted from the cache, however, the thread will have more misses and a high average miss rate, which corresponds to more stress on shared memory resources. Threads that are non-cache-intensive typically have a very low cache miss rate, which corresponds to a minor effect on memory contention.

Note that, while knowledge of thread characteristics and memory re-use profile data (e.g., whether a thread is cache-intensive, cache-sensitive, etc.) can be useful for thread-scheduling decisions, measuring and/or characterizing threads can be challenging and effort-intensive. Performing "offline" measurements and characterizations for threads in isolation (with each thread running independently) often does not result in accurate predictions. Accurate performance and resource usage may depend on specific workloads and on interactions that only occur when two or more threads are executing simultaneously. Furthermore, gathering such data offline involves additional effort for already-overloaded data center managers. However, performing accurate measurements and characterizations "online" (e.g., during normal operation) is equally challenging, because the data gathered may depend on the characteristics of the current co-runner(s) for the thread being characterized, and thus may change based on workloads and other factors. In general, determining how applications will respond to and affect each other in an environment with shared resources is difficult.

Embodiments of the present invention involve techniques for predicting thread combinations that will improve the instruction throughput of a CMT processor. Note that, while the following sections describe techniques that involve two or more threads that share a cache, the described techniques are not limited to shared caches, and can be applied to any shared resource.

Characterizing Threads Based on Detected Degradation

Embodiments of the present invention involve techniques for improving the way in which threads are scheduled in a CMT processor. An automated system learns how to predict the performance degradation in the measured IPC values of two threads when they are scheduled on processor cores that share a common cache. Such "cache-aware" predictions are then used to automatically assign threads to cores in an attempt to maximize the total IPC for all threads in the system.

In some embodiments, the system uses learning techniques to predict the percentage change in IPC for a thread when a co-runner changes. The system can measure the percent degradation in IPC for threads when co-runners change to detect threads that consistently cause a large IPC degradation in their co-runners; such behavior is characteristic for cache-intensive threads, which tend to degrade the instruction throughput of their co-runners. Furthermore, the system can determine threads that have a consistently larger percentage degradation in IPC across all possible co-runners; such behavior is expected for cache-sensitive threads. Hence, by observing the percentage degradation in IPC that a thread causes for other threads, and the percentage degradation caused in the same thread by other co-runner threads, the system can predict which threads are cache-intensive and which are cache-sensitive. The system can then use such predictions to group threads in a way that improves the overall IPC across all threads.

In some embodiments, the system continuously monitors a set of metrics for each executing thread. For instance, the system may use processor hardware counters to measure for a thread the average cache accesses for a time interval (e.g., a second), the average cache misses for the time interval, and/or the average number of instructions for the time interval. The system may use these raw metrics directly (e.g., accesses-per-second (APS), misses-per-second (MPS), and instructions per second (IPS)), or normalize some of the metrics to get per-instruction values (e.g., accesses-per-instruction (API), misses-per-instruction (MPI), and instructions per cycle (IPC)—note that the corresponding raw (per-second) and normalized (per instruction or cycle) terms indicate substantially similar underlying trends, and can be used interchangeably throughout the present disclosure). Note that in some processors measuring MPS may be difficult, but IPS, which declines when many misses occur, may also be used to get a rough estimate of MPS and APS.

In some embodiments, the system uses the above-described metrics to estimate the cache-intensity and cache-sensitivity of a thread. Experimental results indicate that several grouped values for such characteristics correspond with certain values for thread MPI and API relative to the MPI and API values observed for other threads in the system. In particular, a combination of high MPI and high API metric values for a thread is a sign of a cache-intensive thread (which tends to cause high IPC degradation for other co-runner threads). A combination of low MPI and high API metric values for a thread is a sign of a cache-sensitive thread (whose IPC may decrease significantly in percentage terms for some specific types of co-scheduled threads). Threads with low API metric values typically do not have high MPI metrics and thus do not cause much memory or cache contention (i.e., are non-cache-intensive).

Note that the described techniques for characterizing thread cache behavior can predict not only a percentage change in the IPC of a thread when its co-runners are changed, but can also predict the absolute IPC of a thread as a function of the properties of its co-runners. In some embodiments, additional input variables used for making such predictions can be a thread's previous IPC observed with other previous co-runners and the difference in the average MPI between the current co-runners and the previous co-runners.

Predictive Forecasting System for Thread Scheduling

Embodiments of the present invention involve a rule-based predictive forecasting system that uses the thread metrics and/or resource-usage characterizations of multiple threads to predict changes in IPC for possible thread-scheduling decisions. This forecasting system can use measured metrics to predict which threads will cause relatively more "stress" (e.g., contention) for the cache/memory hierarchy and how each particular thread will respond to different co-runners. The forecasting system can then use this information to group threads together across resources in a way that reduces overall resource contention, thereby improving the absolute IPC for all threads. For instance, the forecasting system can be used to predict the percentage degradation in the IPC of a given thread if its co-runner is changed from a first thread to a second thread, based on the API and MPI of the three threads in question.

In some embodiments, the forecasting system uses the sum of the miss rates for two or more threads as an estimate of "stress" for a portion of the processor. The forecasting system can track this value over time, and strive to make predictive scheduling choices that minimize this value. For instance, when contemplating changing a co-runner for a thread, the system may predict the change in stress by looking at the cache miss rate and cache access rate for the thread as well as the miss rate of the current co-runner and the miss rate of the proposed co-runner.

Figure 2:
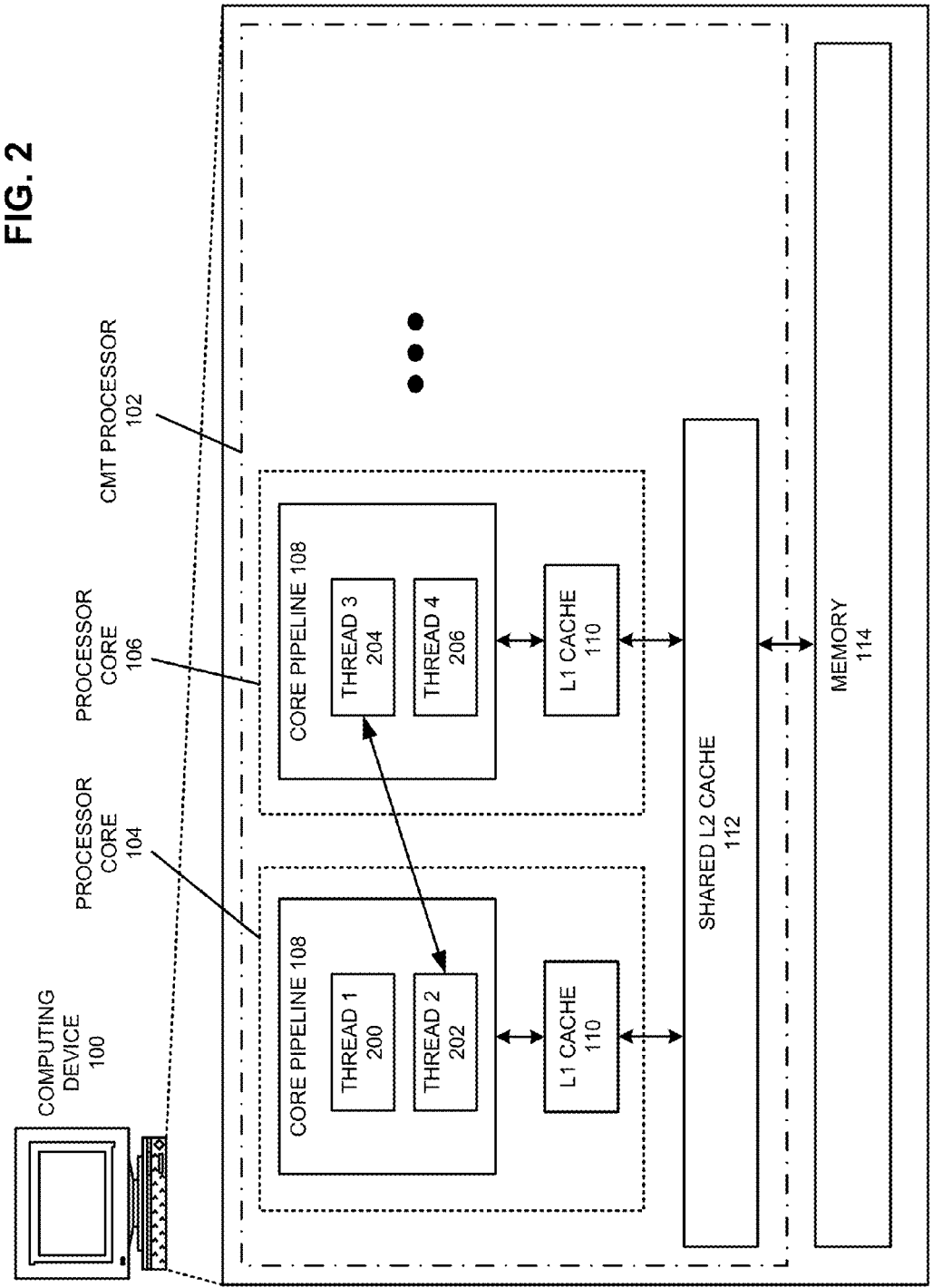
FIG. 2 illustrates an exemplary potential scheduling change for the exemplary computing device of FIG. 1 in accordance with an embodiment.

FIG. 2 illustrates an exemplary potential scheduling change for the exemplary computing device 100 of FIG. 1. In FIG. 2, two threads (thread 1 200 and thread 2 202) execute on processor core 104 and share an L1 cache 110, while two other threads (thread 3 204 and thread 4 206) execute on processor core 106, and share a second different L1 cache 110. When considering a scheduling change that swaps thread 2 202 and thread 3 204, the forecasting system would need to consider the predicted change in IPC for all four threads. For instance, in order to estimate the impact of such a swap on the $IPC_1$ of thread 1 200, the forecasting system may consider: the cache miss rate $MPI_1$ and cache access rate $API_1$ for thread 1 200; the cache miss rate $MPI_2$ and cache access rate $API_2$ for thread 2 202; and the cache miss rate $MPI_3$ and cache access rate $API_3$ for thread 3 204. Similarly, to estimate the impact of such a swap on the $IPC_2$ of thread 2 202, the forecasting system would consider $MPI_2$, $API_2$, $MPI_1$, $API_1$, $MPI_4$, and $API_4$. Note that in some instances the forecasting system may not need to consider the API of every thread. For instance, in the first comparison, the forecasting system may only need to consider a subset of the metrics (e.g., only $MPI_1$, $API_1$, $MPI_2$ and $MPI_3$, and not $API_2$ and $API_3$) when predicting a percentage change in the $IPC_1$ of thread 1 200.

In the example of FIG. 2, if $MPI_2$ is high and $MPI_1$ is low, the sum of IPCs for processor core 104 is likely to improve if the swap is made. However, swapping the high-MPI thread 2 202 to processor core 106 is likely to reduce the total IPC for processor core 106. But, if thread 4 206 is cache-insensitive or non-cache-intensive, the change may result in an improvement (or no change) to the total IPC for processor core 106 as well. In general, a beneficial scheduling change in this scenario would result in a prediction (and hopefully a corresponding actual improvement if the change is executed) in the overall instruction rate for all four threads (e.g., the sum of the post-switch IPCs for all threads would be larger than the sum of the pre-switch IPCs).

Figure 3:
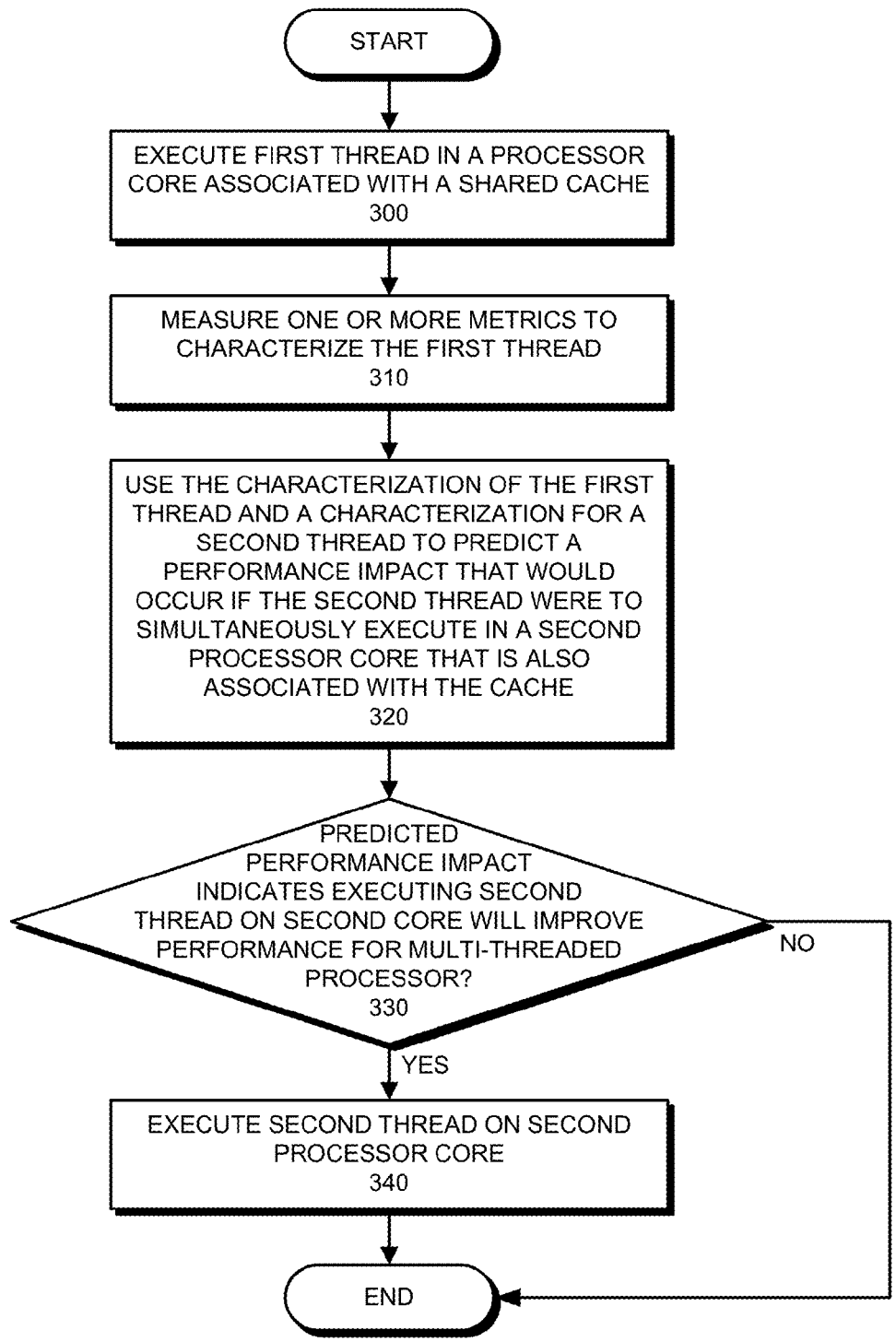
FIG. 3 presents a flow chart that illustrates the process of predictively scheduling a thread in a multi-threaded processor in accordance with an embodiment.

FIG. 3 presents a flow chart that illustrates the process of predictively scheduling threads in a multi-threaded processor. During operation, the system executes a first thread in a processor core that is associated with a shared cache (operation 300). During such execution, the system measures one or more metrics to characterize the first thread (operation 310). Then, the system uses the characterization of the first thread and a characterization for a second thread to predict a performance impact that would occur if the second thread were to simultaneously execute in a second processor core that is also associated with the cache (operation 320). If the predicted performance impact indicates that executing the second thread on the second processor core will improve performance for the multi-threaded processor (operation 330), the system executes the second thread on the second processor core (operation 340); otherwise, the process ends.

In some embodiments, the forecasting system includes a fuzzy rulebase to track data points and predict changes in the IPC of threads. For instance, the forecasting system may involve a linear combination of basis functions of the form $$F(x) = \sum_{i=1}^{N} p_i w_i(x),$$

where $p_i$ (where $i=1 \ldots, N$) are tunable parameters that are adjusted in the course of learning, i is the number of rules, x is a k-dimensional vector of parameters, and $w_i(x)$ is a function which provides weights for the parameters. For instance, a function $w_i(x)$ may be of the form:

$$w_i(x) = \mu_1^i(x_1) \cdot \mu_2^i(x_2) \cdot \ldots \cdot \mu_k^i(x_k),$$

where each function $\mu_j^i(y)$ is a function on the domain of values for x. For example, for a given thread t in the preceding example (in FIG. 2), k=6, $x_1 = APS_t$, $x_2 = MPI_t$, $x_3 = APS_{current\text{-}co\text{-}runner}$, $x_4 = MPIcurrent_{co\text{-}runner}$, $x_5 = APS_{new\text{-}candidate\text{-}co\text{-}runner}$, and $x_6 = MPI_{new\text{-}candidate\text{-}co\text{-}runner}$. Given a set of values for all of the threads being considered, the forecasting system can plug the current metrics for the threads into the fuzzy rulebase to predict the total IPC change for a thread migration being considered.

In some embodiments, the forecasting system considers the total sum of the miss rates (e.g., the total MPS/MPI) for all threads as an estimate of overall stress in the system. The forecasting system may take the existing stress as an input, and then strive to predict scheduling changes that will result in a reduced stress, thereby maximizing the instruction throughput for the computing environment. In some embodiments, the forecasting system may also consider other factors, such as thread fairness and reducing power usage. For instance, the system may be configured to sometimes make scheduling changes that reduce the overall possible instruction throughput to ensure that a given thread is able to make progress.

Note that the parameters of the fuzzy rulebase can be tuned during operation of the forecasting system based on predicted and observed performance. For instance, the system may first use the fuzzy rulebase to make a set of predictions, and then, after making a thread-scheduling change: 1) compare the observed performance changes with the predicted performance changes, and 2) update the parameters of the fuzzy rulebase to more accurately reflect the observed performance changes. For example, a parameter may be updated using a formula such as:

$$P_{new} = P_{old} + \alpha \cdot E \cdot W,$$

where the learning rate $\alpha$, amount of error E, and weight W for the error are used to determine how much to adjust the value of the parameter (P) in response to an observed value that differs from the predicted value. Hence, parameters in the forecasting system can be updated after every data point (e.g., for every set of measured metrics) to configure and continuously adjust the statistical model of the system based on changes in behavior.

Note also that a wide range of other statistical techniques and models may be used to track data points and to predict changes in the IPC of threads. For instance, the forecasting system may also make use of neural network techniques.

In some embodiments, training the forecasting system involves using one or more data-gathering techniques to gather data points for thread metrics, characterizations, and interactions. Note that the data-gathering techniques, and the number of initial data points needed, may vary based on factors such as the computing environment, application characteristics, and administrator preferences. For instance, one data-gathering technique may quickly generate data points by periodically (e.g., every second) re-shuffling groups of threads. Such a forced migration may introduce some additional system overhead, but also allows the forecasting system to quickly build a model of thread metrics and characterizations and to begin making beneficial scheduling predictions. Alternatively, the system may gather data more slowly (and with lower overhead) during normal execution (e.g., based on normal non-predictive scheduling, start, stop, and migration of threads). Note that thread data can be gathered in parallel (for multiple threads at once) or sequentially, as desired. In some embodiments, the system may passively gather data for an initial interval, and then begin predictive scheduling when a threshold of data has been gathered. For instance, the system may first initiate a series of forced migrations until a certain number of data points have been gathered (e.g., 100 data points), and then begin cache-aware scheduling using predictions. Alternatively, the system may already use predictions even during initial training. In this scenario, the predictions may initially be somewhat rough and/or erroneous, but become more tuned and beneficial as more data is gathered.

One example involves training and using a forecasting system that includes a fuzzy rulebase to make scheduling decisions for a four-core processor that can simultaneously execute four threads. In this processor, the four processor cores are split into two pairs of cores, with each pair sharing a separate cache. The forecasting system can gather data by:

1. Running three different combinations of four threads for one second each, while recording the MPS, APS, and change in IPS for each thread.
2. Training the fuzzy rulebase using the gathered data to predict the percentage change in the IPS of a thread based on the six input variables described above.
3. For a testing phase, deploying four new benchmark threads (or keeping the same threads that were used during training)
4. Running the new set of threads for one second and then measuring their MPS, APS, and IPS.
5. Using the trained fuzzy rulebase to perform a migration that is predicted to maximize the average IPS for the four threads (e.g., using the measured absolute IPS value and predicting the percentage change in IPSs for any particular thread migration).
6. Measuring the new values of MPS, APS, and IPS for the threads, and tuning the statistical model as needed based on the observed values.
7. Performing additional thread migrations if the fuzzy rulebase predicts that such migrations will increase the average IPS for the four threads.
8. Repeating steps 6 and 7 until the statistical model cannot find any migrations that are predicted to increase the average IPS for the four threads.

Consider for the example of the previous paragraph two threads (threads 1 and 2) that are both cache-intensive and cache-sensitive, and two other threads that are cache-intensive but cache-insensitive (threads 3 and 4). All four threads access their respective caches frequently, but threads 1 and 2 tend to re-use cached data, while threads 3 and 4 tend to access new data, and hence cause relatively more memory contention. In such a situation, it may not be clear what the best scheduling strategy would be. For instance, in the absence of a forecasting system, one heuristic might be to equalize the cache miss rate for the two caches by separating the two cache-insensitive threads (e.g., by pairing threads 1 and 3 on a first cache, and threads 2 and 4 on a second cache). Such a grouping may lead to improved performance if cache-sensitive threads 1 and 2 are able to access a small set of needed blocks sufficiently frequently to keep such blocks pinned in their caches (e.g., via an LRU cache replacement strategy), and the rest of the cache spaces are available to cache-insensitive threads 3 and 4. However, if the cached data of threads 1 and 2 is frequently displaced, their instruction throughput could drop dramatically. Thus, an alternate heuristic might group threads 1 and 2 together to share a cache, with threads 3 and 4 sharing the second cache. However, such a grouping might also lead to problems if the combined working sets of threads 1 and 2 interfere with each other (e.g., displace each other from their shared cache). Another general factor to consider is that a high level of contention for the memory bus may lead to a saturation of the memory bus that causes a non-linear decrease in performance.

The described forecasting system can gather metric data for all four threads, and then use historical metric and interaction data to find a good balance for the specific blend of threads and hardware that are present. More specifically, the forecasting system can gather data for different degrees of cache intensity and cache sensitivity, and use this data to formulate a beneficial scheduling prediction that maximizes the total instruction throughput for all four threads. For example, the forecasting system may determine from the available data that grouping two moderately cache-intensive threads together is beneficial, but that grouping two highly cache-intensive threads together should be avoided due to an associated predicted decline in performance.

Note that the inputs to the forecasting system are not specific thread or application identifiers, but are instead general thread characteristics (e.g., IPC, MPC, APC). Because the statistical model that maps thread characteristics to predicted performance changes is purely based on miss rate and access rate, the general prediction principle is application-independent (e.g., operates only using such miss rates, and independent of any application-specific identifiers). The characteristics of a thread may change over time due to changes in workload or other factors (e.g., changes in applications, user patterns, and/or time-of-day behavior), but such changes are simply measured and then input into the forecasting system as additional data points. Hence, the described system is self-managing, and detects and adjusts to changes in an "online" manner (e.g., during operation, without involving a preceding, offline set of profiling runs). Note also that the described techniques can be scaled to arbitrary numbers of threads (e.g., all of the threads in a server, cluster, etc.), unlike other scheduling heuristics that attempt to sample different thread schedules before arriving at scheduling decisions. In other words, the preceding example can be extended to N threads running on N cores, and then extended to K threads running on N cores, with the forecasting system gathering and benefiting from metrics and characterization data that is gathered for all of those threads.

In some embodiments, the system maintains a running average of MPS/MPI and APS/API values. For instance, the system may measure the miss rate and access rate every second, but update the parameters estimating MPS and APS for a thread using formulas such as:

$$MPS_{new} = \alpha \cdot MPS_t + (1-\alpha) \cdot MPS_{previous} \text{ and}$$

$$APS_{new} = \alpha \cdot APS_t + (1-\alpha) \cdot APS_{previous},$$

where $MPS_{previous}$ and $APS_{previous}$ are the values used in the previous time interval, $MPS_t$ and $APS_t$ are the currently measured values, $\alpha$ is a scalar that determines the weight of historical values, and $MPS_{new}$ and $APS_{new}$ are the new values for the metrics that will be used for the thread in the forecasting system in the current time interval. Carrying some amount of history in these parameters facilitates smoothing out fluctuations in the cache and access miss rates.

Note that the forecasting system can typically use existing processor hardware counters to gather measured values. For instance, an operating system command may be available to start tracking for processes and return measured values (e.g., a "cpuTrack" command that takes an interval setting, and returns the values of the hardware counters). In some embodiments, the system may use other hardware and/or software counters instead of (and/or in addition to) MPI, API, and IPC as inputs to the forecasting system.

Note also that a number of system entities could be configured to include the forecasting system and to manage thread scheduling and migrations. For instance, aspects of the forecasting system might be included in the operating system kernel, scheduler, and/or in a customized user-level process. Some or all aspects of the forecasting system may also be implemented using additional processor hardware.

In some embodiments, the described techniques can be applied to systems in which each processor core can simultaneously execute more than two threads. For instance, in some embodiments, the described techniques may collect MPI, API, and IPC information from two or more co-runner threads in a processor core, and then average these metrics over the co-runners. In some embodiments, the described techniques may also be applied to systems with more than two cores. In an architecture where more than two cores are present, the described techniques may additionally involve choosing two cores between which possible migrations should be evaluated (e.g., by choosing cores randomly, or by sequentially choosing all cores and considering only their neighboring cores for possible migrations).

In summary, embodiments of the present invention involve techniques for predicting thread combinations that will improve the performance of a CMT processor. An automated rule-based forecasting system learns how to predict the performance degradation in the measured instruction throughput of two threads when they are scheduled on processor cores that share a common resource. The forecasting system then uses such cache-aware predictions to schedule threads into beneficial groupings, thereby improving the overall instruction throughput for the computing environment.

Computing Environment

In some embodiments of the present invention, cache-aware techniques for predicting thread combinations that will improve performance can be incorporated into a wide range of computing devices in a computing environment.

Figure 4:
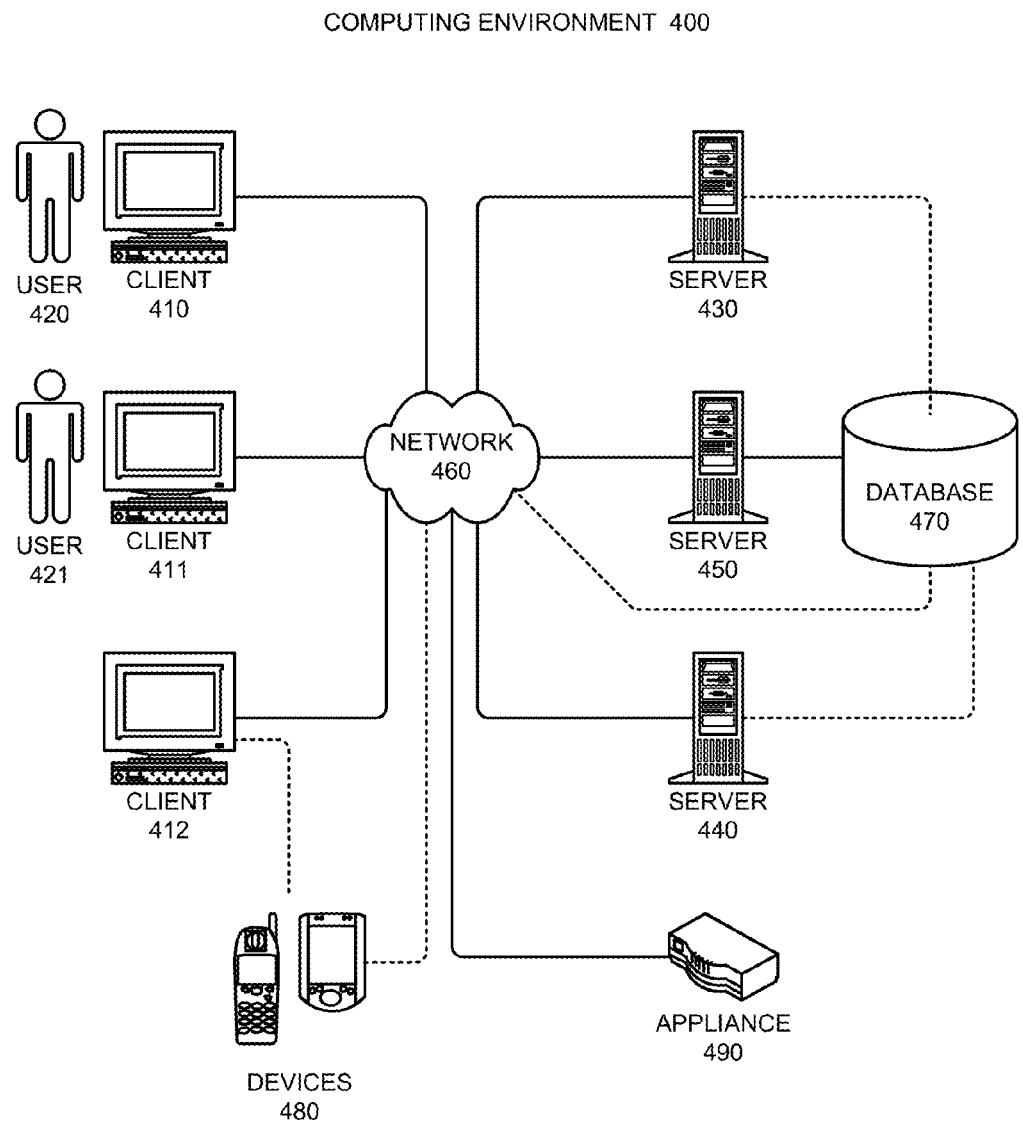
FIG. 4 illustrates a computing environment in accordance with an embodiment.

FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, and appliance 490.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. In some embodiments of the present invention, database 470 is used to store information related to virtual machines and/or guest programs. Alternatively, other entities in computing environment 400 may also store such data (e.g., servers 430-450).

Devices 480 can include any type of electronic device that can be coupled to a client, such as client 412. This includes, but is not limited to, cell phones, personal digital assistants (PDAs), smart-phones, personal music players (such as MP3 players), gaming systems, digital cameras, portable storage media, or any other device that can be coupled to the client. Note that, in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Note that different embodiments of the present invention may use different system configurations, and are not limited to the system configuration illustrated in computing environment 400. In general, any device that is capable of storing and/or dynamically replicating data segments may incorporate elements of the present invention.

Figure 5:
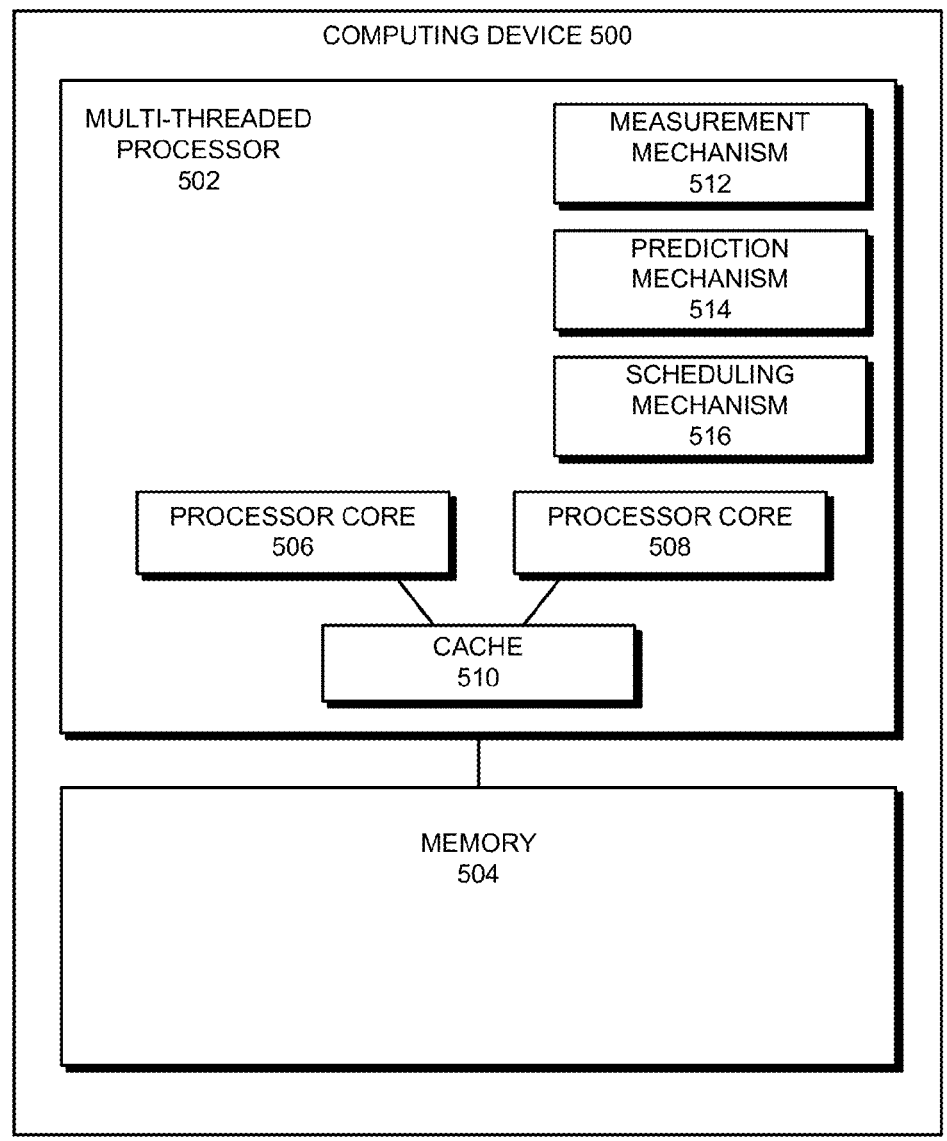
FIG. 5 illustrates an exemplary computing device that includes a processor with structures that support predictive thread scheduling in accordance with an embodiment.

FIG. 5 illustrates an exemplary computing device 500 that includes a multi-threaded processor 502 and memory 504. Multi-threaded processor 502 includes a first processor core 506, a second processor core 508, and a cache 510 associated with the two processor cores (506-508). Processor 502 also includes measurement mechanism 512, prediction mechanism 514, and scheduling mechanism 516. Processor 502 uses measurement mechanism 512, prediction mechanism 514, and scheduling mechanism 516 to perform predictive, cache-aware thread scheduling.

During operation, processor 502 uses measurement mechanism 512 to measure one or more metrics to characterize a first thread executing in processor core 506. Processor 502 then invokes prediction mechanism 514, which uses the characterization of the first thread and a characterization of a second thread to predict a performance impact associated with simultaneously executing the second thread in processor core 508 (or in processor core 506, if processor core 506 is able to execute multiple threads simultaneously). If the predicted performance impact indicates that executing the second thread on the second processor will improve performance, processor 502 then uses scheduling mechanism 516 to simultaneously execute the second thread on processor core 508 (or on processor core 506, as described above).

In some embodiments of the present invention, some or all aspects of measurement mechanism 512, prediction mechanism 514, and/or scheduling mechanism 516 can be implemented as dedicated hardware modules in processor 502. For example, processor 502 can include one or more specialized circuits for performing the operations of the mechanisms. Alternatively, some or all of the operations of measurement mechanism 512, prediction mechanism 514, and/or scheduling mechanism 516 may be performed using general-purpose circuits in processor 502 that are configured using processor instructions.

Although FIG. 5 illustrates measurement mechanism 512, prediction mechanism 514, and/or scheduling mechanism 516 as being included in processor 502, in alternative embodiments some or all of these mechanisms are external to processor 502. For instance, these mechanisms may be incorporated into hardware modules external to processor 502. These hardware modules can include, but are not limited to, processor chips, application-specific integrated circuit (ASIC) chips, field-programmable gate arrays (FPGAs), memory chips, and other programmable-logic devices now known or later developed.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for predictively scheduling a thread in a multi-threaded processor, comprising:
    executing a first thread in a processor core associated with a shared cache that is also associated with a second processor core;
    executing a second thread in a third processor core which is not associated with the cache;
    executing a third thread in the second processor core;
    while executing the first thread, measuring one or more metrics to characterize the first thread;
    measuring one or more metrics to characterize the second thread;
    measuring one or more metrics to characterize the third thread;
    using the characterization of the first thread and a characterization of a second thread to predict a performance impact associated with simultaneously executing the second thread in a second processor core which is associated with the cache, wherein predicting the performance impact comprises predicting an impact in an execution metric for the first thread and an impact in an execution metric for the second thread while the first thread and the second thread access the shared cache when simultaneously executing, and wherein predicting the performance impact involves using the characterization of the third thread and the characterization of the second thread in addition to the characterization of the first thread to determine whether migrating the second thread to the second processor core will improve performance for the multi-threaded processor; and
    when the predicted performance impact indicates that executing the second thread on the second processor core will improve performance for the multi-threaded processor, executing the second thread on the second processor core.

2. The method of claim 1, wherein measuring one or more metrics includes measuring one or more of the following over a time interval:
    the number of cycles elapsed per second for the processor core or the second processor core;
    the average instructions executed per second by a given thread;

the average cache accesses per second for the given thread; and the average cache misses per second for the given thread.

3. The method of claim 2, wherein characterizing the given thread involves using the measured metrics to determine whether the given thread is one or more of the following:
cache-intensive;
cache-sensitive; and
cache-insensitive.

4. The method of claim 2, wherein predicting the performance impact involves predicting a degradation in the average instructions executed per second for one or more of the following:
the first thread;
the second thread; and
the third thread.

5. The method of claim 4, where the method further comprises gathering data for thread characteristics and associated performance impacts by performing one or more of the following:
periodically migrating one or more threads between processor cores of the multi-threaded processor; and
opportunistically gathering data during normal multi-threaded execution in the multi-threaded processor.

6. The method of claim 5, wherein the method uses online thread characteristic and performance data to facilitate scheduling threads across processor cores.

7. The method of claim 5, wherein the method facilitates application-independent scheduling techniques that are self-managing across changing data sets, changing data access patterns, and changing user requests.

8. The method of claim 5, wherein the method further comprises:
using the gathered data as inputs to a forecasting system; and
using the forecasting system to predict the performance impact.

9. The method of claim 8, wherein the method further comprises using statistical feedback from measured metrics, thread characteristics and thread interactions to update a parameter of the forecasting system.

10. The method of claim 1, wherein improving performance for the chip multi-threaded processor involves one or more of the following:
improving the overall instruction throughput for the chip multi-threaded processor; and
reducing the power consumed by the chip multi-threaded processor while executing the threads.

11. The method of claim 1, wherein the execution metric for the first thread comprises instructions per cycle for the first thread and the execution metric for the second thread comprises instructions per cycle for the second thread.

12. The method of claim 1, wherein a processor core of the multi-threaded processor can execute multiple threads simultaneously; and
wherein the processor core and the second processor core are a single processor core that can simultaneously execute both the first thread and the second thread.

13. A non-transitory computer-readable storage medium storing instructions that when executed by a computer cause the computer to perform a method for predictively scheduling a thread in a multi-threaded processor, the method comprising:
executing a first thread in a processor core associated with a shared cache that is also associated with a second processor core;

executing a second thread in a third processor core which is not associated with the cache;
executing a third thread in the second processor core;
while executing the first thread, measuring one or more metrics to characterize the first thread;
measuring one or more metrics to characterize the second thread;
measuring one or more metrics to characterize the third thread;
using the characterization of the first thread and a characterization of a second thread to predict a performance impact associated with simultaneously executing the second thread in a second processor core which is associated with the cache, wherein predicting the performance impact comprises predicting an impact in an execution metric for the first thread and an impact in an execution metric for the second thread while the first thread and the second thread access the shared cache when simultaneously executing, and wherein predicting the performance impact involves using the characterization of the third thread and the characterization of the second thread in addition to the characterization of the first thread to determine whether migrating the second thread to the second processor core will improve performance for the multi-threaded processor; and
when the predicted performance impact indicates that executing the second thread on the second processor core will improve performance for the multi-threaded processor, executing the second thread on the second processor core.

14. The non-transitory computer-readable storage medium of claim 13, wherein measuring one or more metrics includes measuring one or more of the following over a time interval:
the number of cycles elapsed per second for the processor core or the second processor core;
the average instructions executed per second by a given thread;
the average cache accesses per second for the given thread; and
the average cache misses per second for the given thread.

15. The non-transitory computer-readable storage medium of claim 14, wherein characterizing the given thread involves using the measured metrics to determine whether the thread is one or more of the following:
cache-intensive;
cache-sensitive; and
cache-insensitive.

16. The non-transitory computer-readable storage medium of claim 15, wherein predicting the performance impact involves predicting a degradation in the average instructions executed per second for one or more of the following:
the first thread;
the second thread; and
the third thread.

17. The non-transitory computer-readable storage medium of claim 16, where the method further comprises gathering data for thread characteristics and associated performance impacts by performing one or more of the following:
periodically migrating one or more threads between processor cores of the multi-threaded processor; and
opportunistically gathering data during normal multi-threaded execution in the multi-threaded processor.

18. The non-transitory computer-readable storage medium of claim 17, wherein the method further comprises:
using the gathered data as inputs to a forecasting system; and using the forecasting system to predict the performance impact.

19. A multi-threaded processor that facilitates predictive thread scheduling, comprising:
- a first processor core;
- a second processor core;
- a third processor core which is not associated with the cache;
- a first cache associated with the first processor core and the second processor core;
- a measurement mechanism that is configured to measure one or more metrics to characterize a first thread executing in the first processor core, one or more metrics to characterize the second thread, and one or more metrics to characterize the third thread;
- a prediction mechanism that is configured to use the characterization of the first thread and a characterization of a second thread to predict a performance impact associated with simultaneously executing the second thread in the second processor core, wherein, while predicting the performance impact, the prediction mechanism is further configured to predict an impact in an execution metric for the first thread and an impact in an execution metric for the second thread while the first thread and the second thread access the shared cache when simultaneously executing, and wherein, while predicting the performance impact, the prediction mechanism is configured to use the characterization of the third thread and the characterization of the second thread in addition to the characterization of the first thread to determine whether migrating the second thread to the second processor core will improve performance for the multi-threaded processor; and
- a scheduling mechanism that is configured to execute the second thread on the second processor core when the predicted performance impact indicates that executing the second thread on the second processor will improve performance for the multi-threaded processor.

* * * * *

UNITED STATES PATENT AND TRADEMARK OFFICE
CERTIFICATE OF CORRECTION

PATENT NO. : 8,533,719 B2
APPLICATION NO. : 12/754143
DATED : September 10, 2013
INVENTOR(S) : Fedorova et al.

Page 1 of 1

It is certified that error appears in the above-identified patent and that said Letters Patent is hereby corrected as shown below:

In the Specification

In column 8, line 38, delete "basis" and insert -- basic --, therefor.

In column 8, line 55, delete "MPIcurrent$_{-co\text{-}runner}$," and insert -- MPI$_{current\text{-}co\text{-}runner}$, --, therefor.

In column 10, line 9, delete "training)" and insert -- training). --, therefor.

Signed and Sealed this
Seventh Day of January, 2014

Margaret A. Focarino
*Commissioner for Patents of the United States Patent and Trademark Office*